United States Patent
Bent et al.

(10) Patent No.: US 9,852,146 B1
(45) Date of Patent: Dec. 26, 2017

(54) DISTRIBUTED METADATA SERVERS FOR CLUSTER FILE SYSTEMS USING SHARED LOW LATENCY PERSISTENT KEY-VALUE METADATA STORE

(71) Applicant: EMC IP Holding Company LLC, Hopkinton, MA (US)

(72) Inventors: John M. Bent, Los Alamos, NM (US); Sorin Faibish, Newton, MA (US); James M. Pedone, Jr., West Boylston, MA (US); Percy Tzelnic, Concord, MA (US); Dennis P. J. Ting, Groton, MA (US); Latchesar A. Ionkov, Los Alamos, NM (US); Gary Grider, Los Alamos, NM (US)

(73) Assignees: EMC IP Holding Company LLC, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/663,634

(22) Filed: Mar. 20, 2015

(51) Int. Cl.
G06F 17/30 (2006.01)
G06F 11/14 (2006.01)

(52) U.S. Cl.
CPC .... *G06F 17/30171* (2013.01); *G06F 11/1479* (2013.01); *G06F 17/30203* (2013.01)

(58) Field of Classification Search
CPC ........... G06F 17/30171; G06F 11/1479; G06F 17/30203
See application file for complete search history.

(56) References Cited

U.S. PATENT DOCUMENTS 5,062,038 A * 10/1991 Jordan, Jr. ........ G06F 17/30171
707/E17.007
6,173,293 B1 * 1/2001 Thekkath .......... G06F 17/30067
(Continued)

OTHER PUBLICATIONS

G. Congiu et al., "One Phase Commit: A Low Overhead Atomic Commitment Protocol for Scalable Metadata Services," IEEE International Conference on Cluster Computing Workshops, 2012.
(Continued)

*Primary Examiner* — Bryce Bonzo
*Assistant Examiner* — Jonathan Gibson
(74) *Attorney, Agent, or Firm* — Ryan, Mason & Lewis, LLP

(57) ABSTRACT

A cluster file system is provided having a plurality of distributed metadata servers with shared access to one or more shared low latency persistent key-value metadata stores. A metadata server comprises an abstract storage interface comprising a software interface module that communicates with at least one shared persistent key-value metadata store providing a key-value interface for persistent storage of key-value metadata. The software interface module provides the key-value metadata to the at least one shared persistent key-value metadata store in a key-value format. The shared persistent key-value metadata store is accessed by a plurality of metadata servers. A metadata request can be processed by a given metadata server independently of other metadata servers in the cluster file system. A distributed metadata storage environment is also disclosed that comprises a plurality of metadata servers having an abstract storage interface to at least one shared persistent key-value metadata store.

20 Claims, 4 Drawing Sheets

(56) References Cited

U.S. PATENT DOCUMENTS

| | | | | |
|---|---|---|---|---|
| 6,324,581 B1* | 11/2001 | Xu | ................... | G06F 17/30171 |
| | | | | 707/999.01 |
| 7,617,216 B2* | 11/2009 | Fridella | ............. | G06F 17/30082 |
| 8,495,044 B2* | 7/2013 | Buban | ................. | G06F 17/3007 |
| | | | | 707/704 |
| 8,700,683 B2* | 4/2014 | Cooney | ............ | G06F 17/30126 |
| | | | | 707/812 |
| 9,235,609 B1 | 1/2016 | Pandey et al. | | |
| 9,578,130 B1* | 2/2017 | Nguyen | ................. | H04L 67/32 |
| 2009/0094243 A1* | 4/2009 | Oshri | ............... | G06F 17/30171 |

OTHER PUBLICATIONS

"Is Key-Value Data Storage in your Future?", http//www.enterprisestorageforum.com/storage-management/is-key-value-data-storage-in-your-future-1.html, downloaded on Nov. 29, 2016.
Bent et al., "Key-Value Store with Internal Key-Value Storage Interface", U.S. Appl. No. 14/579,323, filed Dec. 22, 2014.

\* cited by examiner

FIG. 3

```
310 ~ function rename(old_path,new_path)
       // To obtain a lot of parallelism, use many locks in the system
       // for only a single lock for the entire storage namespace, then every
       // modification would lock the ENTIRE system.
       // just lock the parent directory
       dir1 = parent_dir(old_path)
       dir2 = parencdir(new_path)
       acquire_locks(dir1,dir2)

// do metadata operation to move the file from one directory to another
       dentry = dir1.dentry(old_path)
       dir2.dentry = dentry
       dir1.rm_dentry(dentry)

release_locks(dir1,dir2) 430 (FIG. 4)
     }

320 ~ function parent_dir()
       // function that reads a string like /a/b/c/d/e and return /a/b/c/d
     }
     // each MDS uses this function to acquire locks
330 ~ function acquire_locks( array namespaces[] )
       // first sort locks to avoid race conditions. VERY IMPORTANT.
       sorted_namespaces = namespace_sort(namespaces);
       for namespace in sorted_namespaces {
         key = namespace.id;
         while(1) {
           if (mylock(key)) {
             break;//we got the key
           } else {
             microsleep(n); // sleep and wait for key to unlock
           }
         }
       }
     }
```

*FIG. 4*

```
410 ─┬─ function namespace_sort(namespaces)
        // doesn't matter how they are sorted. Just always do it deterministically
        // if the namespace id is a number, do numerical sort
        // if string, do alpha
        return sorted;
     }

420 ─┬─ function mylock(key)
        // need some sort of support for an atomic operation
        // 1. One possibility is set-and-test:
        //    http://en.wikipedia.org/wiki/Test-and-set
        // 2. A second is compare-and-swap:
        //    http://en.wikipedia.org/wiki/Compare-and-swap
        // 3. A third is a set operation that fails if key-exists
        //    http://redis.io/topics/data-types-intro
        // important, set the value of key to myname
        // then when heartbeat detection finds failure, can
        // scan the keys to remove all locks held by the failed MDS
        // possible optimization: add a secondary index for the values
        atomic_set(key,myname);
     }

430 ─┬─ function release_locks(array namespaces[])
        sorted_namespaces = namespace_sort(namespaces);
        for namespace in sorted_namespaces {
          key = namespace.id;
          myunlock(key);
        }
     }

440 ─┬─ function myunlock(key)
        // unlock the key
        // this will depend on what option was used above in mylock()
        // if 1 or 2 was used, just set the value of the key to 0
        // if 3 was used, then remove the key
     }
```

DISTRIBUTED METADATA SERVERS FOR CLUSTER FILE SYSTEMS USING SHARED LOW LATENCY PERSISTENT KEY-VALUE METADATA STORE

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The field relates generally to data storage, and more particularly, to key-value stores for storing metadata.

BACKGROUND

Metadata is additional data that describes the actual data. For example, metadata can be used in cluster file systems to describe where the corresponding data is stored. Cluster file systems allow multiple client devices to share access to files over a network. For many cluster file systems, especially for High Performance Computing (HPC) applications such as the Linux-based Lustre file system or the General Parallel File System (GPFS) developed by IBM Corp., the metadata servers (MDSs) are a bottleneck that reduce performance gains that would otherwise be available due to the intended parallel data access.

A number of techniques have been proposed or suggested to parallelize metadata access using distributed metadata servers. Unfortunately, when distributed metadata servers access a shared metadata state, the ACID (Atomicity, Consistency, Isolation, Durability) requirements result in complicated locking protocols and multiple round trip communications for coordination to satisfy the two-phase commit protocols required for metadata consistency. See, for example, Giuseppe Congiu et al., "One Phase Commit: A Low Overhead Atomic Commitment Protocol for Scalable Metadata Services," 2012 IEEE Int'l Conf. on Cluster Computing Workshop (2012), incorporated by reference herein.

A need therefore exists for improved metadata servers that allow parallel metadata access to a shared low latency persistent key-value metadata store.

SUMMARY

Illustrative embodiments of the present invention provide a cluster file system having a plurality of distributed metadata servers with shared access to one or more shared low latency persistent key-value metadata stores. In one embodiment, a metadata server comprises at least one hardware device configured to provide an abstract storage interface comprising a software interface module that communicates with at least one shared persistent key-value metadata store providing a key-value interface for persistent storage of key-value metadata, wherein the software interface module provides the key-value metadata to the at least one shared persistent key-value metadata store in a key-value format, wherein the shared persistent key-value metadata store is accessed by a plurality of the metadata servers.

In at least one exemplary embodiment, a metadata request is processed by a given metadata server independently of other metadata servers in the plurality of the metadata servers. The processing of the metadata request may comprise locking one or more directories in a namespace affected by the metadata request. The locking of the one or more directories optionally employs a failure detection mechanism to unlock the one or more directories if the metadata server processing the metadata request fails.

A distributed metadata storage environment is also disclosed that comprises a plurality of metadata servers that each comprise an abstract storage interface comprising a software interface module that communicates with at least one shared persistent key-value metadata store providing a key-value interface for persistent storage of key-value metadata. The shared persistent key-value metadata store is accessed by the plurality of the metadata servers.

As noted above, illustrative embodiments described herein provide significant improvements relative to conventional metadata storage arrangements. In some of these embodiments, use of metadata servers with an abstract storage interface to a shared persistent key-value metadata store allows parallel metadata access by a plurality of uncoordinated metadata servers.

BRIEF DESCRIPTION OF THE DRAWINGS

FIG. 3 illustrates exemplary pseudo code for a rename operation in accordance with aspects of the present invention; and FIG. 4 illustrates exemplary pseudo code that supports the rename operation of FIG. 3.

DETAILED DESCRIPTION

Figure 1:
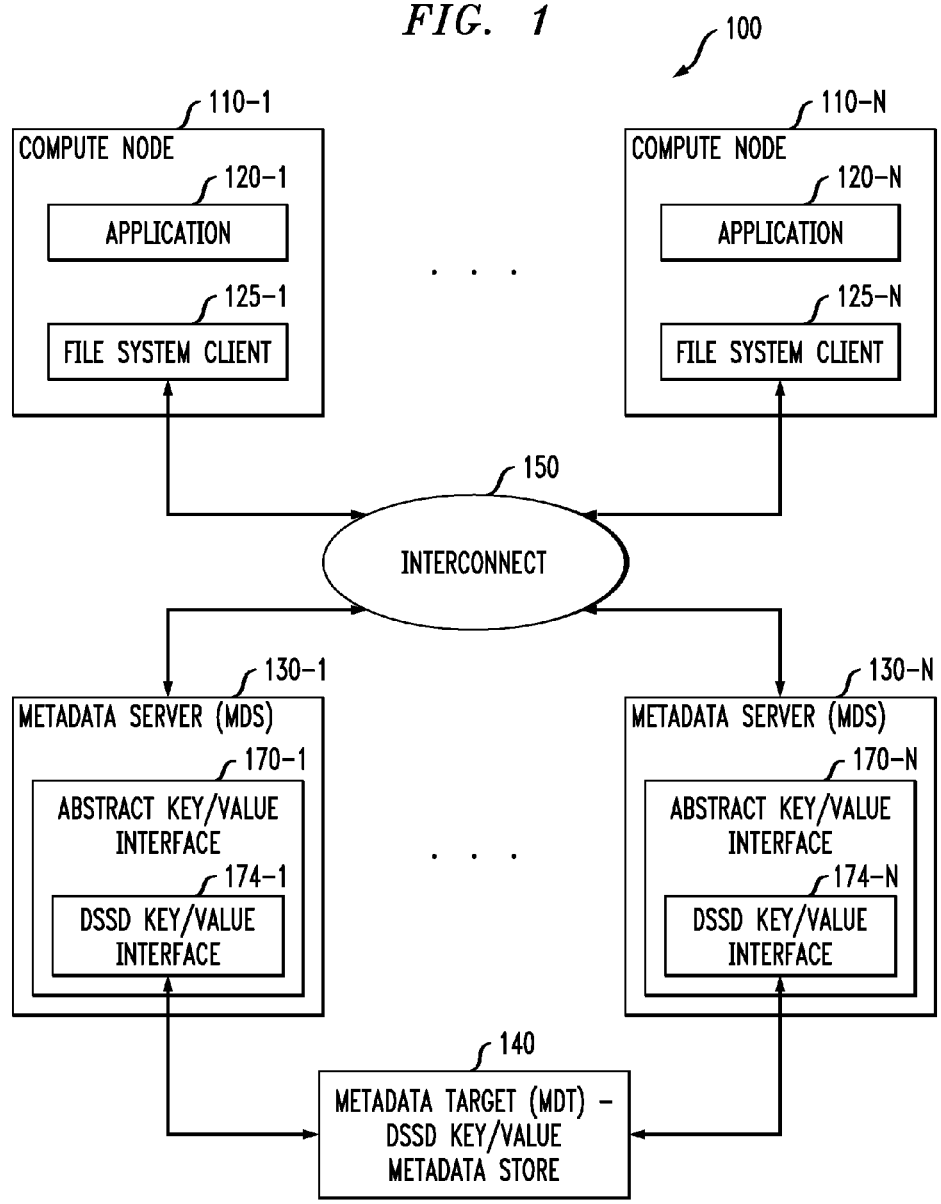
FIG. 1 illustrates an exemplary metadata storage environment incorporating aspects of the present invention.

Illustrative embodiments of the present invention will be described herein with reference to the storage of data and metadata generated by an exemplary parallel computing system and associated clients, servers, storage arrays and other processing and storage devices. It is to be appreciated, however, that the invention is not restricted to use with the particular illustrative parallel computing system and device configurations shown. Accordingly, the terms "parallel computing system" and "key-value store," as used herein, are intended to be broadly construed.

According to one aspect of the invention, a plurality of distributed metadata servers in a cluster file system have shared access to one or more low latency persistent key-value metadata stores, such as the DSSD™ flash storage system from EMC Corp. According to a further aspect of the invention, the plurality of distributed metadata servers each provide an abstract storage interface into which key-value metadata operations are applied, and then passed to the one or more shared low latency persistent key-value metadata stores. As discussed herein, the exemplary abstract storage interface maintains semantic information when storing metadata to storage and optionally supports low latency batch operations so that groups of key-value pairs can be processed at once.

Aspects of the present invention recognize that a number of emerging storage devices provide a key-value interface. For example, the DSSD™ flash storage system from EMC Corp. comprises a key-value flash-based storage system. Although flash memory will often be used for the high-speed memory of the shared low latency persistent key-value metadata stores, other types of low-latency memory could be used instead of flash memory. Typically, such low-latency memories comprise electronic memories, which may be implemented using non-volatile memories, volatile memories or combinations of non-volatile and volatile memories. Accordingly, the term "shared low latency persistent key-value metadata store," as used herein, is intended to be broadly construed so as to encompass any persistent storage device or other arrangement of hardware and associated software or firmware that collectively provides a high-speed, low latency storage media for persistent storage of key-value data and metadata using a key-value interface.

In one exemplary embodiment of the present invention, the abstract storage interface is included as a new storage layer in the metadata servers to leverage knowledge of the key-value storage interface of the low latency persistent storage destination. In this manner, the semantic information associated with the metadata can be stored by the metadata servers in the one or more shared low latency persistent key-value metadata stores that provide a key-value interface. The metadata servers can store key-value metadata using direct key-value operations on the shared low latency persistent key-value metadata stores. As used herein, a hardware accelerated metadata server comprises a metadata server that is substantially optimized for the storage of key-value metadata and/or communication using keys and values, thereby allowing direct calls to the hardware layer.

FIG. 1 illustrates an exemplary metadata storage environment 100 incorporating aspects of the present invention. As shown in FIG. 1, an exemplary application 120-1 through 120-N executing on a compute node 110-1 through 110-N can read, write and/or query data, such as objects, byte ranges and/or key-value data using a corresponding file system client 125-1 through 125-N, in a known manner.

In order to store, obtain or modify metadata, the file system clients 125-1 through 125-N communicate with a plurality of exemplary metadata servers 130-1 through 130-N (hereinafter, MDS 130) over an interconnect 150 or a network (not shown). The exemplary metadata servers (MDS) 130 provide metadata services for the cluster file system and manage a metadata target (MDT) 140 that stores the file metadata.

In the exemplary embodiment, the metadata servers 130 are implemented as conventional Lustre metadata servers, as modified herein to provide features and functions of the present invention. In addition, the exemplary metadata target is implemented as a DSSD key/value metadata store 140 or another shared low latency persistent key-value metadata store.

The source code for the exemplary Lustre metadata servers 130 can be obtained, for example, from http://lustre.org/download/. Additional details regarding conventional aspects of an exemplary Lustre file system may be found in, for example, Cluster File Systems, Inc., "Lustre: A Scalable, High-Performance File System," pp. 1-13 (November 2002); F. Wang et al., "Understanding Lustre Filesystem Internals," Tech Report ORNL/TM-2009/117, pp. 1-95 (April 2010), and Metadata Servers, http://wikilustre.org/index.php/FAQ_-_Metadata_Servers, which are each incorporated by reference herein. See also, U.S. patent application Ser. No. 13/931,833, filed Jun. 29, 2013, entitled "Cluster File System with Metadata Server for Storage of Parallel Log Structured File System Metadata for a Shared File," incorporated by reference herein.

As shown in FIG. 1, the exemplary metadata servers 130-1 through 130-N comprise corresponding abstract key/value interfaces 170-1 through 170-N. Abstract key/value interfaces 170-1 through 170-N further comprise corresponding DSSD key/value interfaces 174-1 through 174-N.

Thus, the exemplary conventional Lustre metadata servers are modified to include the abstract storage interface 170 (storage layer) into which key-value metadata operations are applied, and then passed to one or more persistent storage devices providing a key-value interface, such as the exemplary DSSD key/value metadata store 140.

The abstract storage interfaces 170 provide a storage-specific interface, such as interface 174, for each type of storage destination, such as the exemplary DSSD key/value metadata store 140, and can therefore leverage knowledge about the specific storage destination to ensure that the semantic information associated with the stored key-value metadata is maintained. For example, the exemplary abstract storage interface 170 comprises a DSSD key-value interface 174 for storing key-value data in the exemplary DSSD shared low latency persistent key-value metadata store 140. As noted above, the exemplary DSSD key-value metadata store 140 provides a key-value interface.

In one exemplary implementation, the exemplary metadata storage environment 100 may comprise, for example, approximately 100 of the compute nodes 110-1 through 110-N for each metadata server 130. In addition, the exemplary metadata storage environment 100 may comprise, for example, approximately 10 of the metadata servers 130 for each exemplary DSSD key-value metadata store 140.

When key-value metadata is stored using a key-value interface that maintains the semantic information associated with the stored key-value data, the metadata can be accessed more easily. See, for example, U.S. patent application Ser. No. 14/579,323, filed Dec. 22, 2014, entitled "Key-Value Store With Internal Key-Value Storage Interface," and incorporated by reference herein, for a discussion of key-value interfaces that maintain semantic information.

In addition, the exemplary DSSD key-value metadata store 140 permits global availability across the multiple compute nodes 110-1 through 110-N. Further, the exemplary DSSD key-value metadata store in accordance with one or more embodiments of the present invention permits a relaxed namespace partitioning that allows any metadata server 130 to access any portion of the namespace. In addition, the metadata can all be maintained in the DSSD key-value metadata store 140 without caches in the metadata servers because the shared low latency DSSD persistent key-value metadata store 140 allows a greater degree of parallelization without the round-trip coordination required with conventional techniques.

Thus, the flexibility of the abstract storage interface 170 allows the exemplary metadata storage environment 100 to be easily adapted to a variety of emerging storage environments, such as the exemplary DSSD™ flash storage system, and to leverage additional low latency persistent storage architectures that provide key-value interfaces.

The abstract storage interface 170 optionally performs any necessary conversions/translations to leverage, for example, flash storage devices that provide key-value interfaces for storing metadata. In this manner, the metadata servers 130 provide a key-value interface 170 to one or more additional low latency persistent storage devices having a key-value interface.

While the exemplary embodiments of the present invention employ DSSD™ flash storage system, other storage devices that provide low latency persistent storage and key-value interfaces can be employed, as would be apparent to a person of ordinary skill in the art.

Each shared low latency persistent key-value metadata store 140, such as the exemplary DSSD key-value metadata store 140, in the present embodiment is assumed to comprise a flash memory or other high-speed memory having a substantially lower access time than storage disks. More than one shared low latency persistent key-value metadata store 140 can be employed with mirroring of the metadata between them if each individual DSSD key-value metadata store 140 does not provide sufficiently high-availability. In the event of multiple shared low latency persistent key-value metadata stores 140, the locks must be held longer than in a standalone DSSD key-value metadata store 140 implementation, while the multiple shared low latency persistent key-value metadata stores 140 mirror the metadata updates. Locking is discussed further below in conjunction with FIG. 3.

It is noted that in a standalone DSSD key-value metadata store 140 implementation, only one copy of the metadata is stored in the single DSSD key-value metadata store 140, and multiple copies of metadata consistent across multiple metadata servers do not need to maintain consistency.

In addition, each metadata server 130 comprises a processor coupled to a memory (not shown). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code.

The processing circuitry of each metadata server 130 implements pseudo code discussed further below in conjunction with FIGS. 3 and 4. Each metadata server 130 may be implemented at least in part in the form of software that is stored in the memory and executed by the processor. Each metadata server 130 comprising a processor, a memory and network interface components as described above is an example of what is more generally referred to herein as a "processing device." Each of the devices described herein may similarly be implemented as a processing device comprising a processor, a memory and network interface components.

The DSSD key-value interfaces 174 store the key-value metadata pairs by writing the key-value metadata pairs directly to the shared low latency persistent key-value metadata store 140. Therefore, the semantic information associated with the key-value data stored on storage 140 is maintained.

With semantic knowledge in the one or more shared low latency persistent key-value metadata store 140, processors in these storage devices can optionally assist with operations such as index building, reorganization, resorting, deduplication and compression.

While the exemplary embodiment employs flash memory as a high-speed memory in the more shared low latency persistent key-value metadata store 140, other types of low-latency memory could be used instead of flash memory. Typically, such low-latency memories comprise electronic memories, which may be implemented using non-volatile memories, volatile memories or combinations of non-volatile and volatile memories.

Conventional techniques employ multiple metadata servers and partition the namespace across them. This requires distributed ACID transactions, however, for operations that affect multiple portions of the namespace, such as a rename operation. The rename operation in a conventional environment often involves two portions of the namespace (old path and new path) and the metadata server coordinator is only responsible for one portion of the namespace. Thus, the metadata server coordinator must enlist another metadata server that is responsible for the other affected portion of the namespace. The two metadata servers must perform multiple operations to ensure that the metadata changes are consistent. The namespace is partitioned to improve parallelization so that each metadata server can cache pieces of the namespace, as necessary, without worrying about shared cache consistency.

Figure 2:
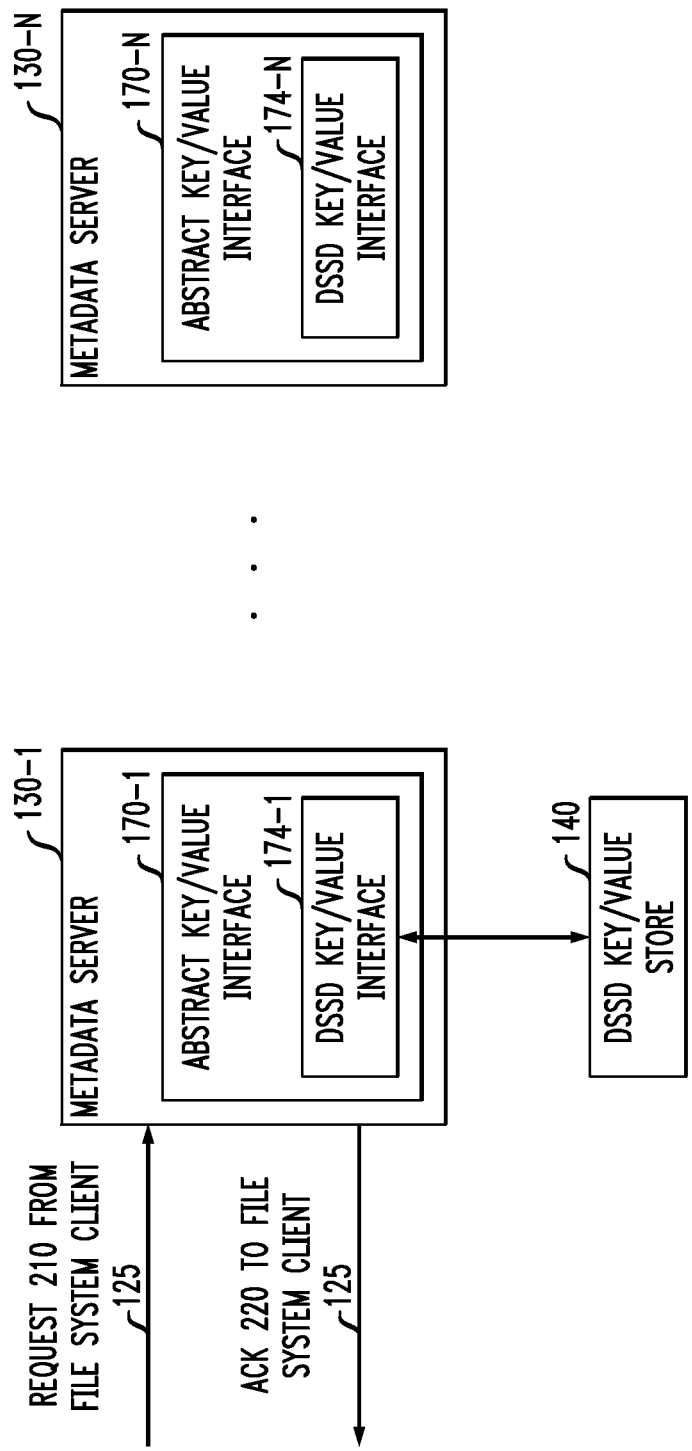
FIG. 2 illustrates uncoordinated metadata access by one or more metadata servers in the metadata storage environment of FIG. 1.

FIG. 2 illustrates uncoordinated metadata access by one or more metadata servers 130 in the metadata storage environment 100 of FIG. 1. As shown in FIG. 2, a request 210 from a file system client 125 is received by a metadata server, such as metadata server 130-1. The request 210 may comprise, for example, a rename operation, as discussed further below in conjunction with FIG. 3, or another operation that impacts multiple portions of the namespace.

The request 210 can also comprise basic file operations, such as to create a file, remove a file, or to modify file permissions. These basic file operations are also improved by one or more embodiments of the present invention, as better load balancing is achieved because any of the metadata servers 130 can process the request 210 and access the shared low latency persistent key-value metadata store 140.

As shown in FIG. 2, the request 210 from the file system client 125 can be processed by metadata server 130-1 without contacting any of the other metadata servers 130. After completing processing of the request 210, the metadata server 130-1 provides an acknowledgement (ACK) 220 to the requesting file system client 125.

FIG. 3 illustrates exemplary pseudo code 300 for a rename operation for the abstract storage interface 170 (FIG. 1) in accordance with aspects of the present invention. As discussed above in conjunction with FIG. 2, aspects of the present invention allow the rename operation to be handled by a single metadata server 130 (referred to as the coordinator metadata server) without coordinating with other metadata servers 130. In this manner, a rename operation is handled by only one metadata server 130 that does not need to engage any of the other metadata servers 130. As discussed further below, the single metadata server 130 executing the operation, referred to as the coordinating metadata server 130-1, merely obtains the required locks for the two affected directories, makes both metadata changes, commits the transaction, and then releases the locks.

As shown in FIG. 3, when the rename function 310 is invoked, the exemplary pseudo code 300 defines the directories (dir1 and dir2) associated with the old and new paths, respectively, and employs an acquire_locks function 330. The exemplary acquire_locks function 330 sorts lock requests before they are processed to avoid race conditions. In this manner, the metadata servers 130 acquire locks in an of ordered sequence, in a known manner, and avoid deadlocks.

Thereafter, the exemplary pseudo code 300 performs the metadata operation to move the file from one directory (dir1) to a new directory (dir2). The locks are then released using a release_locks function 430, as discussed further below in conjunction with FIG. 4.

The exemplary pseudo code 300 also comprises a parent_dir( ) function 320 that reads a string, such as /a/b/c/d/e, and returns a string /a/b/c/d.

FIG. 4 illustrates exemplary pseudo code 400 that supports the exemplary rename operation of FIG. 3. As shown in FIG. 4, the exemplary pseudo code 400 provides a namespace_sort function 410 that deterministically sorts the namespace. If the namespace identifier is a number, for example, then a numerical sort is performed. Likewise, if the namespace identifier is a string, for example, then an alphabetic sort is performed.

The exemplary pseudo code 400 further comprises a mylock function 420 that supports an atomic operation for lock operations. As shown in FIG. 4, the exemplary mylock function 420 may be implemented using one or more of a set-and-test approach, a compare-and-swap approach, and a set operation that fails if key-exists. In one exemplary implementation, the mylock function 420 avoids starvation when a metadata server holding a lock dies. The exemplary mylock function 420 uses a Byzantine protocol and keep-alive messages to know when orphaned locks can be removed. Generally, Byzantine fault tolerance aims to defend against Byzantine failures, in which components of a system fail with symptoms that prevent some components of the system from reaching agreement among themselves, wherein such agreement is needed for the correct operation of the system. The value of the key is set to myname and if a heartbeat detection determines that a failure has occurred, then the keys are scanned to remove all locks held by the failed metadata server.

As discussed above in conjunction with FIG. 3, locks are released using the release_locks function 430, shown in FIG. 4. The release_locks function 430 itself calls the namespace_sort function 410 and a myunlock function 440 that unlocks the key.

Among other benefits, when the disclosed locking techniques are applied to the DSSD key-value metadata store 140, the key is an identifier to the locked part of the namespace and the value identifies the metadata server holding the lock. Thus, complicated communications protocols to perform distributed locking are not required.

In addition, greater parallelism is achieved with one or more embodiments of the present invention by dispensing with the notion of a primary owner of each portion of the namespace, because any metadata server can access any portion of the namespace. The file system clients 125 can hash metadata requests to any metadata server 130 in the environment 100. The multiple metadata servers 130 use the key-value locks to ensure consistency.

Further, because the metadata servers 130 are independent and can self-manage through the key-value lock system described above, complicated messaging routines and multiple round-trip communications for coordination are not required between the multiple metadata servers.

It is noted that the implementation for operations that only affect only a single portion of the namespace, such as operations to delete or add a file or to change ownership of a file, would be readily apparent to a person of ordinary skill based on the pseudo code 300, 400 of FIGS. 3 and 4, respectively, for the exemplary rename operation that impacts multiple portions of the namespace.

CONCLUSION

It is to be appreciated that the particular operations and associated messaging illustrated in FIGS. 3 and 4 are exemplary only, and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the exemplary metadata storage environment 100. Such components can communicate with other elements of the exemplary metadata storage environment 100 over any type of network or other communication media.

As indicated previously, components of a multi-tier storage system as disclosed herein can be implemented at least in part in the form of one or more software programs stored in memory and executed by a processor of a processing device. A memory having such program code embodied therein is an example of what is more generally referred to herein as a "computer program product."

The computing systems or portions thereof may be implemented using one or more processing platforms each comprising a plurality of processing devices. Each such processing device may comprise a processor, a memory and network interface components of the type described above for metadata servers 130 in FIG. 1.

As indicated above, metadata processing functionality such as that described in conjunction with FIGS. 3 and 4 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of parallel computing systems and associated clients, servers and other processing and storage devices that can benefit from the batch messaging functionality described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A metadata server, comprising:
at least one hardware device configured to provide an abstract storage interface comprising a software interface module that communicates with at least one shared persistent key-value metadata store providing a key-value interface for persistent storage of key-value metadata, wherein said software interface module provides said key-value metadata to said at least one shared persistent key-value metadata store in a key-value format,
wherein said shared persistent key-value metadata store is partitioned across a plurality of metadata servers and wherein a metadata request affecting multiple partitions of the namespace is processed by said metadata server independently of other metadata servers in said plurality of metadata servers.

2. The metadata server of claim 1, wherein said abstract storage interface provides a storage-specific interface for said at least one shared persistent key-value metadata store.

3. The metadata server of claim 1, wherein said software interface module processes at least one batch operation for processing metadata.

4. The metadata server of claim 1, wherein said metadata request is further processed by locking one or more directories in a namespace affected by said metadata request.

5. The metadata server of claim 4, wherein said locking of said one or more directories is performed using an atomic locking operation.

6. The metadata server of claim 4, wherein said locking of said one or more directories employs a failure detection mechanism to unlock said one or more directories if said metadata server processing said metadata request fails.

7. The metadata server of claim 4, wherein said metadata request from a file system client is processed by any of said plurality of metadata servers that are connected to a compute node that executes said file system client.

8. The metadata server of claim 1, wherein a processor in said shared persistent key-value metadata store performs one or more of index building, reorganization, resorting, deduplication and compression of said key-value metadata.

9. The metadata server of claim 1, wherein a key of a given key-value metadata item identifies a locked portion of the namespace and a value of the given key-value metadata identifies a particular metadata server holding the lock.

10. A distributed metadata storage environment, comprising:
a plurality of compute nodes, wherein at least one of said compute nodes comprises a file system client that generates at least one metadata request;
a plurality of metadata servers connected to said plurality of compute nodes using at least one network, wherein each of said plurality of metadata servers comprises an abstract storage interface comprising a software interface module that communicates with at least one shared persistent key-value metadata store providing a key-value interface for persistent storage of key-value metadata, wherein said software interface module provides said key-value metadata to said at least one shared persistent key-value metadata store in a key-value format,
wherein said shared persistent key-value metadata store is partitioned across said plurality of said metadata servers and wherein a metadata request affecting multiple partitions of the namespace is processed by one of said metadata servers independently of other metadata servers in said plurality of metadata servers.

11. The distributed metadata storage environment of claim 10, wherein said abstract storage interface provides a storage-specific interface for said at least one shared persistent key-value metadata store.

12. The distributed metadata storage environment of claim 10, wherein said at least one metadata request is processed by locking one or more directories in a namespace affected by said metadata request using an atomic locking operation.

13. The distributed metadata storage environment of claim 10, wherein said metadata request from said file system client is processed by any one of said plurality of metadata servers that are connected to a compute node that executes said file system client.

14. The distributed metadata storage environment of claim 10, wherein a processor in said shared persistent key-value metadata store performs one or more of index building, reorganization, resorting, deduplication and compression of said key-value metadata.

15. The distributed metadata storage environment of claim 10, wherein a key of a given key-value metadata item identifies a locked portion of the namespace and a value of the given key-value metadata identifies a particular metadata server holding the lock.

16. A method performed by a metadata server in a distributed metadata storage environment, comprising the steps of:
providing an abstract storage interface comprising a software interface module that communicates with at least one shared persistent key-value metadata store providing a key-value interface for persistent storage of key-value metadata, wherein said software interface module provides said key-value metadata to said at least one shared persistent key-value metadata store in a key-value format, wherein said shared persistent key-value metadata store is partitioned across a plurality of metadata servers;
obtaining a metadata request from at least one file system client, wherein said metadata request affects multiple partitions of the namespace and is processed by one of said metadata servers independently of other metadata servers in said plurality of metadata servers; and
processing said metadata request using said at least one shared persistent key-value metadata store using said key-value interface.

17. The method of claim 16, wherein said metadata request is processed by any one of said plurality of metadata servers that are connected to a compute node that executes said at least one file system client.

18. The method of claim 16, wherein said step of processing said metadata request further comprises a step of locking one or more directories in a namespace affected by said metadata request using an atomic locking operation.

19. A tangible machine-readable recordable storage medium, wherein one or more software programs when executed by one or more processing devices implement the steps of the method of claim 16.

20. The method of claim 16, wherein a key of a given key-value metadata item identifies a locked portion of the namespace and a value of the given key-value metadata identifies a particular metadata server holding the lock.

* * * * *